Patented July 24, 1928.

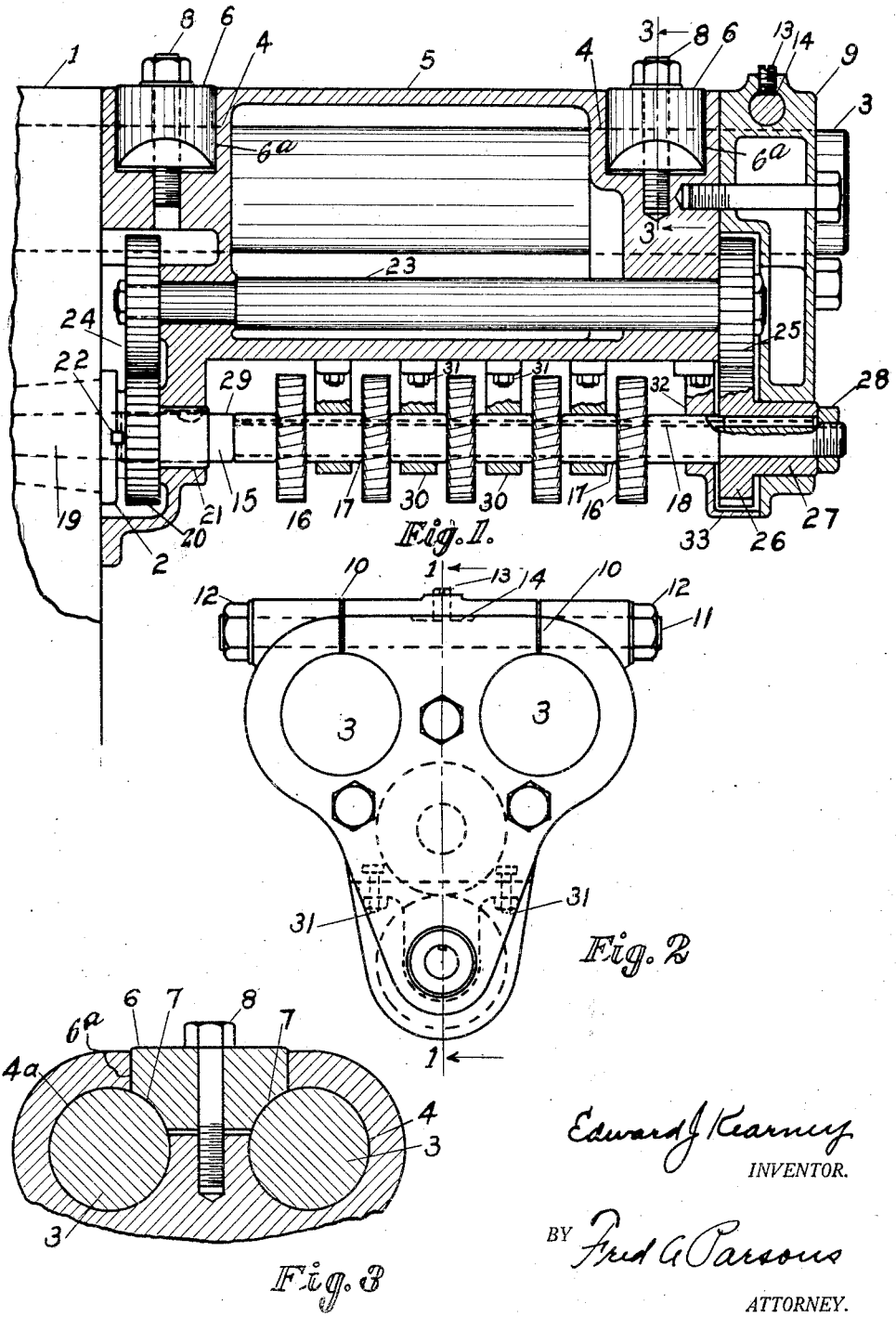

1,678,048

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN, A CORPORATION OF WISCONSIN.

MILLING-MACHINE ARBOR DRIVE AND SUPPORT.

Application filed February 28, 1925. Serial No. 12,254.

This invention relates to arbor driving and more particularly to the means for driving and supporting arbors adapted for the support of milling cutters. Such arbors are ordinarily mounted in axial alignment with the spindle of the machine tool and to be driven therefrom, and act as a support and driving means for one or more removable rotary milling cutters. It is advantageous to use cutters having as small a diameter as may be possible, but this necessitates the use of a relatively small arbor diameter which is a disadvantage, since a small arbor may not provide sufficient strength for driving and supporting the cutter or cutters, particularly if the cutters supported thereupon stand at a considerable distance from the spindle of the machine, thus necessitating transmission of heavy strain, particularly torsional strain, throughout the intervening length of the arbor.

A purpose of the invention is to provide means whereby a plurality of cutters may be mounted upon a relatively long arbor of comparatively small diameter and the requisite power for the operation of the cutters may be transmitted in part through certain portions of the arbor and in part through other portions although both portions are actuated from the same cutter spindle, whereby no portion of the arbor may be subjected to the entire strain of full power transmission.

Other purposes relate to improvement in the supporting and driving of relatively long cutter carrying arbors having relatively small diameter, and to the maintaining of the correct alignment of such arbors and the cutting tools mounted thereon with a machine tool spindle which forms the driving source.

In the accompanying drawings is shown a preferred embodiment of my invention, like reference characters designating the same parts in various views:

Figure 1 is an elevation, mainly in section, of a mechanism embodying my invention, the sectional portion being taken along the line 1—1 of Figure 2.

Figure 2 is a front elevation of the mechanism shown in Figure 1.

Figure 3 is a vertical transverse section of a portion taken along the line 3—3 of Figure 1.

"1" is a fragmentary portion of the column of a machine tool commonly known as a horizontal milling machine in which is rotatably supported a spindle "2". A plurality of overarms "3" are axially adjustable in the column, but may be rigidly clamped therewith in any of their positions of adjustment. Engaging the overarms "3" by the means of suitable cylindrical bores "4" is a main support or housing member "5" which may be rigidly fixed with the arms "3" by means of a plurality of clamp members "6" slidable in suitable bores "6ª" in the member "5". Each of clamps "6" has a plurality of surfaces "7" adapted to engage the respective overarms. The members "6" may be advanced in their respective bores to frictionally engage the surfaces "7" and thereby bind the overarms in the housing "5" by the means of clamp bolts "8" passing through the members and engaging with a threaded bore in the member "5" as particularly shown in Figure 3.

A secondary housing or supporting member "9" likewise removably engages the overarms "3" by means of a suitable plurality of cylindrical bores. Clamp means are provided whereby the member "9" may be fixed with the arms, including slots "10" opening into the respective bores and a clamp bolt "11" passing through the member "9" transversely of the slots "10" and fitted with the nuts "12" engaging threaded ends on the bolt. When either nut "12" is turned by any suitable means to advance the nut along bolt "11", the slots "10" and the bores in the member "9" which engage the respective overarms will be contracted, thus binding the member firmly upon the overarms.

A screw "13" threaded in the member "9" engages a suitable flat "14" on the bolt "11" for preventing the bolt from turning when either nut "12" is turned.

It will be noted that the plurality of overarms provides a slide for the housing members "5" and "9", capable of accurately positioning the members with relation to each other and with the column "1" and spindle "2", and that the members "5" and "9" together form a unitary support for the end of the arbor and for the shaft "23" of the driving train which is journaled therein.

Arbor "15" supports a plurality of milling cutters "16" between which and mounted upon the arbor are a plurality of spacing collars "17". The collars "17" and the milling cutters "16" are keyed with the arbor "15" by the means of a long key or feather "18". The tapered end "19" of the arbor is fitted in a suitable tapered bore in the spindle "2". Co-axially mounted upon and fixed with arbor "15" is a gear "20" having a hub "21" provided with a suitable bearing in the member "5". The gear "20" and arbor "15" with which it is fixed, may be positively driven from the spindle "2" by means of a key or feather "22".

A relatively heavy shaft "23" is provided with suitable bearings for rotation in the member "5" and has upon the one end a gear "24" fixed with the shaft for rotation therewith and meshing with the gear "20" to be driven thereby. Upon the opposite end of the shaft and fixed therewith is a gear "25". Mounted upon the adjacent end of the arbor "15" is a gear "26" meshed with gear "25" and having a hub "27" provided with a suitable bearing in member "9". The gear "26" is keyed to the arbor "15" by the means of key "18" which is extended to pass through the gear. An arbor nut "28" is threaded upon the end of the arbor "15" and when advanced along the arbor by being turned by any suitable means, binds together the various parts consisting of gear "26", cutters "16", and collars "17", thrusting them together and against a shoulder "29" upon the arbor.

A plurality of suitable intermediate bearings "30" are fixed with the member "5" by the means of a plurality of bolts "31" in a suitable position to form bearings in which the various spacing collars "17" may rotate and one of such bearings "32" is provided with a flange "33", which, together with a portion of the member "9", forms a suitable housing for the protection of the operator from the gears "26" and "25".

The above described mechanism provides adequate and improved means for supporting and driving the cutters "16". A portion of the driving torque will be transmitted directly from the spindle through the portion of the arbor adjacent the gear "20" and to the various cutters mounted along this end of the arbor, while another portion of the power will be transmitted to the gears "20" and "24", shaft "23" and gears "25" and "26" to the opposite end of the arbor and thence to the cutters adjacent.

The flange "33" and the members "9" provide an effectual guard and support for the gears "25" and "26" and the members "5" and "9", together with intermediate bearings "30" and "32" and the other bearings along the axis of the arbor provide an effectual support in combination with the overarms "3" whereby the arbor and cutters are supported and the arbor is maintained in correct axial alignment with the spindle "2".

It will be understood that the embodiment disclosed by these drawings and the description relative thereto represents only a preferred form of my invention, and other equivalent forms may be substituted without departing from the spirit or scope thereof.

Having thus fully revealed my invention, I claim:

1. In a milling machine the combination of a column, a tool spindle journaled therein, a housing removably supported from said column, a tool arbor journaled in said housing, and transmission mechanism connecting said arbor to be driven at opposite ends from said spindle including a shaft and gearing rotatably supported from said housing, said shaft and gearing being adapted to materially reduce the torsional deflection of said arbor.

2. In a milling machine having a cutter spindle, the combination of a cutter arbor having one end directly driven from said spindle, and power transmitting mechanism for driving the other end of said arbor from said spindle, said mechanism being adapted to reduce the twisting of one end of said arbor relative to the other when under torsional strain.

3. In a milling machine the combination of a column, a tool spindle journaled therein, an overarm slidably supported from said column, a housing removably supported from said overarm, a tool arbor journaled in said housing, and transmission mechanism connecting said arbor to be driven at opposite ends from said spindle including a shaft journaled in said housing and axially parallel with said arbor, a gear on said shaft connected to be driven from said spindle, and a gear on said arbor connected to be driven from said shaft, said mechanism being adapted to materially reduce the torsional deflection of arbor portions relative to said spindle.

EDWARD J. KEARNEY.